(12) United States Patent
Hong et al.

(10) Patent No.: US 12,525,661 B2
(45) Date of Patent: Jan. 13, 2026

(54) SECONDARY BATTERY COMPRISING GAS SCAVENGING MEMBER

(71) Applicant: LG Energy Solution, Ltd., Seoul (KR)

(72) Inventors: Yeon Suk Hong, Daejeon (KR); Suk Il Youn, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 770 days.

(21) Appl. No.: 17/783,425

(22) PCT Filed: Nov. 3, 2021

(86) PCT No.: PCT/KR2021/015756
§ 371 (c)(1),
(2) Date: Jun. 8, 2022

(87) PCT Pub. No.: WO2022/103054
PCT Pub. Date: May 19, 2022

(65) Prior Publication Data
US 2023/0026380 A1    Jan. 26, 2023

(30) Foreign Application Priority Data
Nov. 10, 2020   (KR) .................. 10-2020-0149185

(51) Int. Cl.
*H01M 10/52*   (2006.01)
*H01M 4/505*   (2010.01)
*H01M 4/525*   (2010.01)

(52) U.S. Cl.
CPC .......... *H01M 10/52* (2013.01); *H01M 4/505* (2013.01); *H01M 4/525* (2013.01)

(58) Field of Classification Search
CPC ....... H01M 10/52; H01M 4/505; H01M 4/525
See application file for complete search history.

(56) References Cited

U.S. PATENT DOCUMENTS

| | | | |
|---|---|---|---|
| 2007/0184334 A1* | 8/2007 | Hong | H01M 4/90 429/535 |
| 2009/0226811 A1* | 9/2009 | Nakaoka | C01G 51/50 429/231.95 |

(Continued)

FOREIGN PATENT DOCUMENTS

| | | |
|---|---|---|
| CN | 103210528 A | 7/2013 |
| CN | 105765770 A | 7/2016 |

(Continued)

OTHER PUBLICATIONS

Search Report dated Feb. 24, 2025 from the Office Action for Chinese Application No. 202180007098.1 Issued Feb. 26, 2025, pp. 1-3.

(Continued)

*Primary Examiner* — Nicholas A Smith
*Assistant Examiner* — Benjamin Eli Kass-Mullet
(74) *Attorney, Agent, or Firm* — Lerner David LLP

(57) ABSTRACT

The present disclosure provides a secondary battery in which an electrode assembly is sealed together with an electrolyte solution within a pouch type battery case, wherein a gas scavenging member is disposed on at least one surface of an inner surface of the battery case. The gas scavenging member defining a pouch containing a mixed solution of an ionic liquid and an amine-based compound.

14 Claims, 3 Drawing Sheets

(56) References Cited

U.S. PATENT DOCUMENTS

| | | |
|---|---|---|
| 2009/0291872 A1 | 11/2009 | Bara et al. |
| 2009/0291874 A1 | 11/2009 | Bara et al. |
| 2011/0014100 A1 | 1/2011 | Bara et al. |
| 2012/0187918 A1 | 7/2012 | Narayan et al. |
| 2012/0321923 A1 | 12/2012 | Yun |
| 2013/0236749 A1 | 9/2013 | Woo et al. |
| 2013/0236750 A1 | 9/2013 | Sato |
| 2014/0377681 A1* | 12/2014 | Noack ................. H01M 8/0234 |
| | | 429/479 |
| 2015/0303510 A1 | 10/2015 | Matsuno et al. |
| 2016/0175808 A1 | 6/2016 | Seo et al. |
| 2016/0293952 A1 | 10/2016 | Kaneda et al. |
| 2016/0296858 A1 | 10/2016 | Hartmann et al. |
| 2018/0001265 A1 | 1/2018 | Hartmann et al. |
| 2019/0252737 A1* | 8/2019 | Oh ...................... H01M 50/124 |
| 2020/0094195 A1* | 3/2020 | Nakamura ........... B01D 53/228 |

FOREIGN PATENT DOCUMENTS

| | | |
|---|---|---|
| CN | 107706446 A | 2/2018 |
| CN | 207217599 U | 4/2018 |
| EP | 1782879 B1 | 6/2013 |
| JP | 2001135314 A | 5/2001 |
| JP | 2007242454 A | 9/2007 |
| JP | 2011230056 A * | 11/2011 |
| JP | 2012-072395 A | 4/2012 |
| JP | 2012190639 A | 10/2012 |
| JP | 2013012448 A * | 1/2013 |
| JP | 2013535775 A | 9/2013 |
| JP | 2014127531 A * | 7/2014 |
| JP | 6672330 B2 | 3/2020 |
| KR | 20110018383 A | 2/2011 |
| KR | 101271920 B1 | 6/2013 |
| KR | 20150014668 A * | 2/2015 ............ H01M 10/52 |
| KR | 20160074844 A | 6/2016 |
| KR | 101741030 B1 | 5/2017 |
| KR | 20170058047 A | 5/2017 |
| KR | 20170134114 A * | 12/2017 .......... H01M 2/0275 |
| KR | 20190022196 A | 3/2019 |
| WO | 2012-161137 A1 | 11/2012 |
| WO | 2019059368 A1 | 3/2019 |

OTHER PUBLICATIONS

International Search Report for Application No. PCT/KR2021/015756 mailed Feb. 9, 2022, pp. 1-3.

* cited by examiner

[FIG. 1]
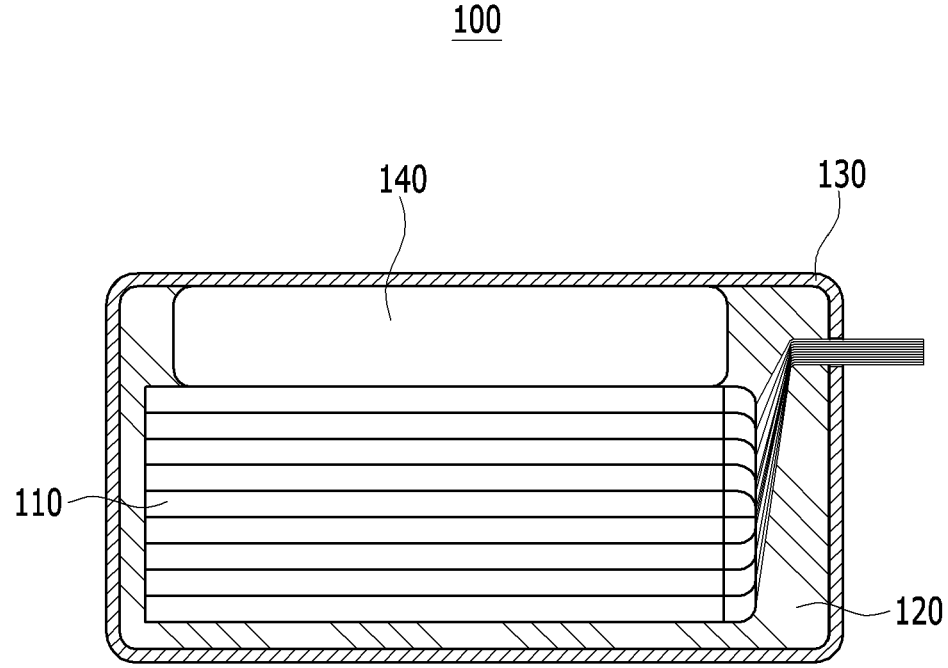

[FIG. 2]
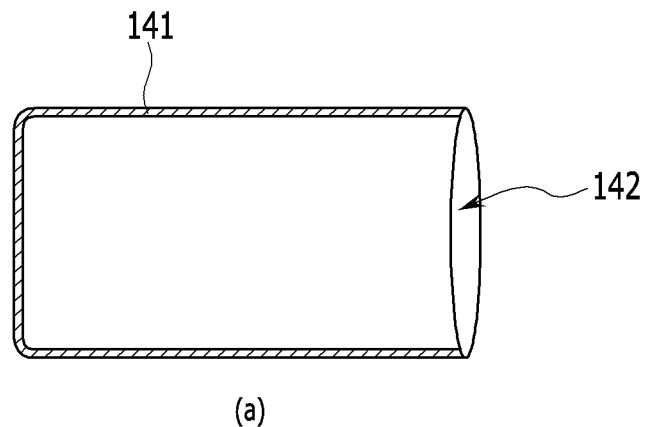
(a)
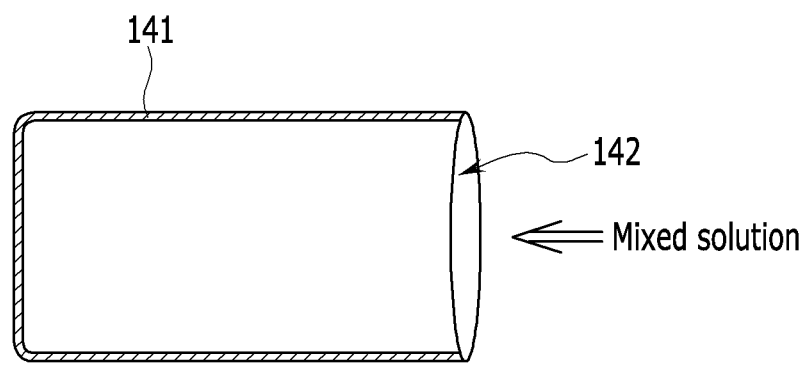
← Mixed solution
(b)
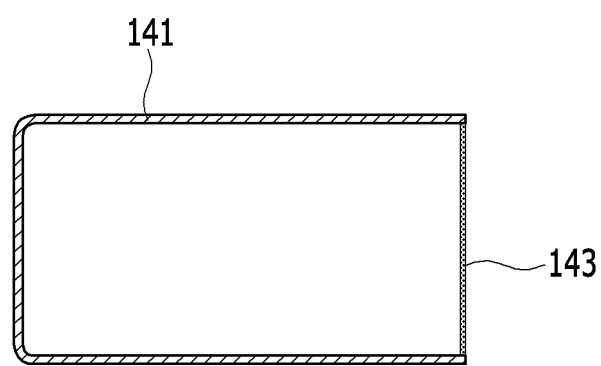
(c)

[FIG. 3]
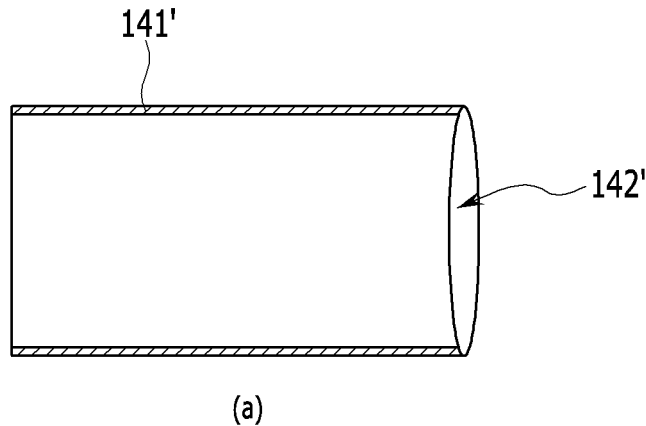
(a)
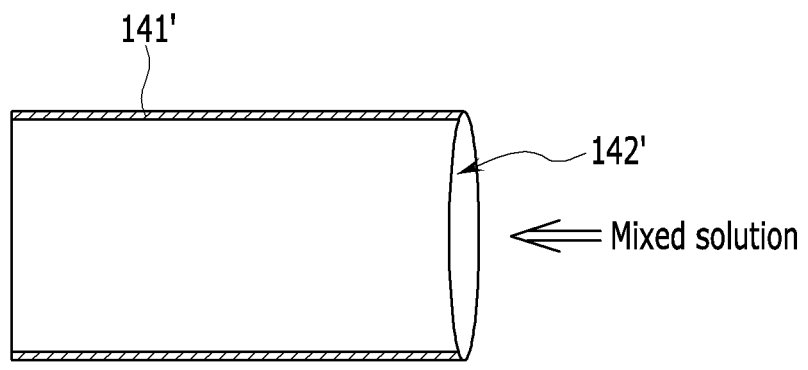
(b)
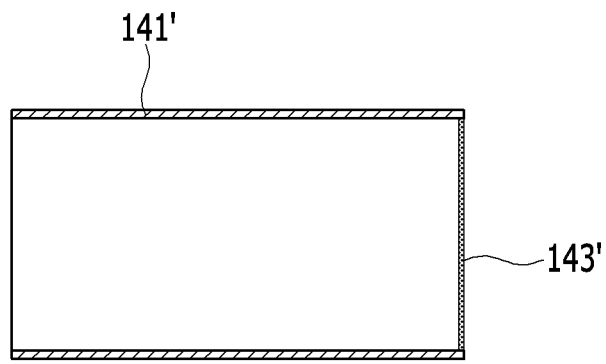
(c)

SECONDARY BATTERY COMPRISING GAS SCAVENGING MEMBER

CROSS CITATION WITH RELATED APPLICATION(S)

The present application is a national phase entry under 35 U.S.C. § 371 of International Application No. PCT/KR2021/015756 filed on Nov. 3, 2021, which claims the benefit of Korean Patent Application No. 10-2020-0149185 filed on Nov. 10, 2020, with the Korean Intellectual Property Office, the disclosures of both of which are incorporated herein by reference in their entirety.

TECHNICAL FIELD

The present disclosure relates to a secondary battery comprising a gas scavenging member.

BACKGROUND ART

Due to the rapid increase in the use of fossil fuels, the demand for the use of alternative energy or clean energy is increasing, and as part thereof, the fields that are being studied most actively are the fields of power generation and power storage using electrochemistry.

At present, a secondary battery is a representative example of an electrochemical device that utilizes such electrochemical energy, and the range of use thereof tends to be gradually expanding.

Recently, along with the increase of the technological development and demand for mobile devices such as portable computers, portable phones, and cameras, the demand for secondary batteries has also sharply increased as an energy source. Among such secondary batteries is a lithium secondary battery exhibiting high charge/discharge characteristics and lifetime characteristics and being environmentally friendly, in which much research has been carried out and which is now commercialized and widely used.

Generally, the secondary battery has a structure in which an electrode assembly comprising a positive electrode, a negative electrode, and a porous separator is built into a battery case in a state of being impregnated with a non-aqueous electrolyte. Further, the positive electrode is generally prepared by coating a positive electrode mixture including a positive electrode active material onto aluminum foil, and the negative electrode is prepared by coating a negative electrode mixture including a negative electrode active material onto a copper foil.

Further, a pouch type battery having a structure in which the stack type or stack-folding type electrode assembly is built into a pouch type battery case of an aluminum laminate sheet attracts considerable attention with reasons of low manufacturing cost, small weight, and easy shape modification, and further, utilization thereof gradually increases.

Meanwhile, as the demand for secondary batteries gradually expands, high energy, high output, and long-term safety are required. Therefore, the use of positive electrode materials having a high Ni content which exhibits high energy and high output, is increasing.

However, when the positive electrode material having a high Ni content is used, issues such as swelling, performance degradation, and packing vents due to the generation of some gas in the pouch type secondary battery, such as generation of $CO_2$ at high temperature, are occurring.

Therefore, there is a need to develop a secondary battery that can solve the above problems.

DETAILED DESCRIPTION OF THE INVENTION

Technical Problem

It is an object of the present disclosure to provide a secondary battery capable of effectively scavenging the gas generated during operation of the secondary battery, improving its lifetime characteristics, and ensuring safety by including a gas scavenging member.

Technical Solution

In order to achieve the above object, according to one embodiment of the present disclosure, there is provided a secondary battery in which an electrode assembly is sealed together with an electrolyte solution within a pouch type battery case,
wherein a gas scavenging member is disposed on at least one surface of the inner surface of the battery case, and
wherein the gas scavenging member has a form in which a mixed solution of an ionic liquid and an amine-based compound is contained inside a pouch.

In one specific embodiment, the pouch may be composed of a gas permeable polymer, and the gas permeable polymer may be a poly[4,5-difluoro-2,2-bis(trifluoromethyl)-1,3-dioxole-co-tetrafluoroethylene]-based material.

More specifically, the gas permeable polymer may be Teflon AF 2400.

In one specific embodiment, the amine-based compound may be an alkanol amine.

Further, the mixed solution may be contained in an amount of 50 ml to 200 ml.

At this time, the amine-based compound may be contained in an amount of 5% to 30% by weight based on the total weight of the mixed solution.

The ionic liquid may be a combination of one or more selected from the group consisting of bis(trifluoromethane) sulfonimide ($Tf_2N^-$), $[CF_3SO_2]^-$, and $[CF_3CO_2]^-$ $[PF_6]^-$ as anions, and one or more selected from the group consisting of 1-butyl-3-methylimidazolium (bmim), 1-butyl-1-methyl pyrrolidinium (bmpyr), and butyltrimethylammonium (bt-mamm) as cations.

Meanwhile, in one specific embodiment, the gas scavenging member has a pouch structure, which may have a form in which a mixed solution injection hole is formed on one side of the gas scavenging member, and the mixed solution injection hole is sealed in a state where the mixed solution is injected.

The gas scavenging member may be arranged on the inner surface of the upper end of the battery case on the basis of a stacking direction of the electrode assembly.

Further, the gas scavenging member may be formed to have a size smaller than an area of an upper end of the electrode assembly on the basis of a stacking direction of the electrode assembly.

Meanwhile, in one specific embodiment, the electrode assembly comprises a positive electrode, a negative electrode, and a separator interposed between the positive electrode and the negative electrode,
the positive electrode may have a positive electrode mixture containing a positive electrode active material formed on at least one surface of a positive electrode current collector, and the positive active material may include a lithium nickel-based-transition metal oxide containing 80 mol % or more of Ni in the total moles of transition metals excluding lithium.

Specifically, the lithium nickel-based-transition metal oxide may be represented by the following Chemical Formula:

$Li_{1+x}Ni_aCo_bM_cO_2$ wherein, $0 \leq x \leq 0.5$, $0.8 \leq a \leq 1$, $0 \leq b \leq 0.2$, $0 \leq c \leq 0.2$, and the M is at least one selected from the group consisting of Mn, Al, Ti, Mg, Zr, W, Y, Sr, F, Si, Na, Cu, Fe, Ca, S and B.

More specifically, the lithium nickel-based-transition metal oxide is $LiNi_{0.8}Co_{0.1}Mn_{0.1}O_2$, $LiNi_aCo_b(Mn_yA_z)_cO_2$, $LiNi_aCo_bA_cO_2$, wherein a, b and c are as defined above, and the A may be at least one selected from the group consisting of Al, Ti, Mg, Zr, W, Y, Sr, F, Si, Na, Cu, Fe, Ca, S and B.

BRIEF DESCRIPTION OF THE DRAWINGS

FIG. 1 is a schematic diagram of a secondary battery according to an embodiment of the present disclosure;

FIGS. 2A-2C are schematic diagrams showing a process of manufacturing a gas scavenging member of the secondary battery of FIG. 1; and FIGS. 3A-3C are schematic diagrams showing a process of manufacturing a gas scavenging member according to another embodiment of the present disclosure.

DETAILED DESCRIPTION OF THE EMBODIMENTS

Hereinafter, the present disclosure will be described in more detail for a better understanding of the present disclosure.

Terms or words used in the present specification and claims should not be construed as limited to ordinary or dictionary terms, and the present disclosure should be construed with meanings and concepts that are consistent with the technical idea of the present disclosure based on the principle that the inventors may appropriately define concepts of the terms to appropriately describe their own disclosure in the best way.

The technical terms provided herein is merely used for the purpose of describing particular embodiments, and is not intended to be limiting of the present disclosure. The singular forms "a," "an," and "the" are intended to include the plural forms as well, unless the context clearly indicates otherwise.

Further, throughout the specification, when a portion is referred to as "including" a certain component, it means that the portion can further include other components, without excluding the other components, unless otherwise stated.

The secondary battery according to an embodiment of the present disclosure may have a form in which an electrode assembly is sealed together with an electrolyte solution within a pouch type battery case. According to the present embodiment, a gas scavenging member is disposed on at least one surface of the inner surface of the battery case, and the gas scavenging member has a form in which a mixed solution of an ionic liquid and an amine-based compound is contained inside the pouch. At this time, the pouch may be composed of a gas permeable polymer, and the mixed solution may be a mixture of an ionic liquid and an amine-based compound.

Here, the gas permeable polymer may be, specifically, a poly[4,5-difluoro-2,2-bis(trifluoromethyl)-1,3-dioxole-co-tetrafluoroethylene]-based material, and the gas permeable polymer may be Teflon AF 2400.

Further, the amine-based compound contained in the pouch made of the gas permeable polymer may be, specifically, an alkanol amine, and more specifically, it may be at least one selected from the group consisting of monoethanol amine, diethanol amine, triethanol amine, methyl diethanol amine, and 2-amino 2-methyl 1-propanol.

As another component, the ionic liquid may be a combination of one or more selected from the group consisting of bis(trifluoromethane)sulfonimide ($Tf_2N^-$), $[CF_3SO_2]^-$, and $[CF_3CO_2]^-$ $[PF_6]^-$ as anions, and one or more selected from the group consisting of 1-butyl-3-methylimidazolium (bmim), 1-butyl-1-methyl pyrrolidinium (bmpyr), and butyltrimethylammonium (btmamm) as cations.

In this case, the mixed solution containing the amine-based compound and the ionic liquid included in the gas scavenging member varies depending on the size of the pouch in detail, but for example, the mixed solution may be contained in an amount of 50% to 95% of the total volume inside the pouch, and more specifically, it may be contained in an amount of 60% to 80%.

Further, of course, since the size of the pouch may vary depending on the size of the secondary battery, the absolute amount of the mixed solution may vary accordingly. Since it is possible to scavenge enough gas to contain at least 50 ml or more, it is preferable that the mixed solution is contained in an amount of 50 ml or more. On the other hand, if the content of the mixed solution is too large, the volume occupied by the gas scavenging member in the secondary battery becomes too large, and thus, specifically, it is preferably contained in an amount of 200 ml or less.

In addition, the amine-based compound contained in the mixed solution may be contained in an amount of 5% to 30% by weight based on the total weight of the mixed solution, and specifically, it may be contained in an amount of 10% by weight to 20% by weight, and more specifically, it may be contained in an amount of 10% to 15% by weight.

If the content of the amine-based compound is too small outside the above range, the amine-based compound is not enough and so the gas scavenging effect is poor. If the content of the amine-based compound is too large, hydrogen carbonate and free amine, which are carbon dioxide absorption products, may precipitate in an ionic liquid, which is thus not preferable.

Meanwhile, the gas scavenging member may be disposed on at least one surface of the inner surface of the battery case, specifically, on the inner surface of the upper end of the battery case on the basis of the stacking direction of the electrode assembly.

At this time, by "it is disposed on the inner surface of the battery case" is meant herein that the gas scavenging member may be attached to the inner surface of the battery case, and subsequently, may be attached to the built-in electrode assembly, and may be formed in a form that is not attached as a separate member. However, it is preferably attached to the inner surface of the battery case or the electrode assembly so that the pouch can be fixed onto the inner surface of the battery case. More specifically, it may be attached to the inner surface of the battery case so as not to interfere with the electrolyte impregnation of the electrode assembly.

Further, the gas scavenging member may be formed to have a size smaller than the area of the upper end of the electrode assembly on the basis of the stacking direction of the electrode assembly as described above, and specifically, it may be 0.2% to 15% smaller than the area of the upper end of the electrode assembly.

When the gas scavenging member is formed to be too small outside the above range, the gas generated during the operation of the secondary battery cannot be sufficiently scavenged, which is thus not preferable.

As an example, a schematic diagram of a secondary battery 100 according to an embodiment of the present disclosure is shown in FIG. 1.

Referring to FIG. 1, the secondary battery 100 has a structure in which an electrode assembly 110 is sealed together with an electrolyte solution 120 within a pouch type battery case 130, and a gas scavenging member 140 is disposed on the upper surface of the electrode assembly 110 and the upper inner surface of the battery case 130, that is, between the upper surface of the electrode assembly 110 and the upper end of the battery case 130.

At this time, it may be in the form of being attached to the upper surface of the electrode assembly 110, and may be in the form of being attached to the inner surface of the upper end of the battery case 130, and as a separate member, it may be simply interposed between the upper surface of the electrode assembly 110 and the inner surface of the upper end of the battery case 130.

At this time, the size of the prepared gas scavenging member 140 may be designed to be smaller than the horizontal and vertical lengths of the upper surface of the electrode assembly 110.

Here, the gas scavenging member 140 may be prepared, for example, by the method as shown in FIGS. 2A-2C and 3A-3C.

Referring to FIG. 2A first, the gas scavenging member can be prepared by sealing three surfaces under high-temperature as so to make a film made of two gas-permeable polymers as a pouch shape, so as to include a three-sided sealing part 141 and a one-sided mixed solution injection port 142. Turning to FIG. 2B, a mixed solution according to the present disclosure is then injected through the mixed solution injection port 142. Finally, as shown in FIG. 2C, the mixed solution injection port 142 is sealed under high-temperature.

Alternatively, referring to FIGS. 3A-3C, the gas scavenging member can be prepared by folding a film made of a gas permeable polymer in half so as to include the two-sided sealing part 141' and the one-sided mixed solution injection port 142', and high-temperature sealing the two side surfaces of the folded part as shown in FIG. 3A. A mixed solution according to the present disclosure is then injected through the mixed solution injection port 142 as shown in FIG. 3B. Finally, the mixed solution inlet or port 142 is sealed using high-temperature as shown in FIG. 3C.

Therefore, the gas scavenging member according to the present disclosure has a pouch structure, which has a form in which a mixed solution injection hole is formed on one side of the gas scavenging member, and the mixed solution injection hole is sealed in a state where the mixed solution is injected.

Meanwhile, the electrode assembly includes a positive electrode, a negative electrode, and a separator interposed between the positive electrode and the negative electrode. The positive electrode has a positive electrode mixture containing a positive electrode active material formed on at least one surface of a positive electrode current collector, and the positive active material may include a lithium nickel-based-transition metal oxide containing 80 mol % or more of Ni in the total moles of transition metals excluding lithium.

Here, the lithium nickel-based-transition metal oxide may be represented by the following Chemical Formula.

$Li_{1+x}Ni_aCo_bM_cO_2$ wherein, $0 \leq x \leq 0.5$, $0.8 \leq a \leq 1$, $0 \leq b \leq 0.2$, $0 \leq c \leq 0.2$, and the M is at least one selected from the group consisting of Mn, Al, Ti, Mg, Zr, W, Y, Sr, F, Si, Na, Cu, Fe, Ca, S and B.

More specifically, the lithium nickel-based-transition metal oxide may be $LiNi_{0.8}Co_{0.1}Mn_{0.1}O_2$, $LiNi_aCo_b(Mn_yA_z)_cO_2$, $LiNi_aCo_bA_cO_2$, wherein a, b and c are as defined above, and the A is at least one selected from the group consisting of Al, Ti, Mg, Zr, W, Y, Sr, F, Si, Na, Cu, Fe, Ca, S and B.

When the lithium nickel-based transition metal oxide, that is, an oxide having 80 mol % or more of a nickel content in the total moles of transition metals excluding lithium, is included as a positive electrode active material, it is suitable for high energy and high output requirements, but a large amount of $CO_2$ is generated at high temperature, performance deteriorates due to gas traps and the incidence of venting issues is high. Thereby, since the gas control requirement is higher, the secondary battery including the gas scavenging member according to the present disclosure can operate efficiently.

Meanwhile, the positive active material may further include, for example, lithium manganese oxides such as chemical formulae $Li_{1+x}Mn_{2-x}O_4$ (where, x is 0 to 0.33), $LiMnO_3$, $LiMn_2O_3$, $LiMnO_2$; lithium copper oxide ($Li_2CuO_2$); vanadium oxides such as $LiV_3O_8$, $LiFe_3O_4$, $V_2O_5$, and $Cu_2V_2O_7$ lithium manganese composite oxide represented by chemical formulae $LiMn_{2-x}M_xO_2$ (where, M=Co, Ni, Fe, Cr, Zn or Ta, and x=0.01 to 0.1) or $Li_2Mn_3MO_8$ (where, M=Fe, Co, Ni, Cu or Zn); $LiMn_2O_4$ with a Li portion of chemical formula substituted with an alkaline earth metal ion; a disulfide compound; $Fe_2(MoO_4)_3$, and the like. As long as it has a configuration of a conventionally known positive active material, it is not limited thereto and may be further included.

The positive electrode mixture may further include a conductive material and a binder together with the positive electrode active material described above.

The negative electrode may be prepared in a form in which a negative electrode mixture including a negative electrode active material is coated onto a negative electrode current collector, and the negative electrode mixture may further include the conductive material and binder as described above together with the negative electrode active material.

Since the positive electrode current collector, the negative electrode active material, the negative electrode current collector, the conductive material, the binder, and the like are well known in the art, a detailed description thereof is omitted herein.

In addition, since the separator included in the electrode assembly of the secondary battery, the electrolyte solution built-in together with the electrode assembly in the secondary battery, and the laminate sheet configuration of the battery case are known in the art, a detailed description thereof is omitted herein.

Hereinafter, preferred examples of the present disclosure, comparative examples for comparing them, and experimental examples for evaluating them are described. However, it will be obvious to those skilled in the art that these examples are for illustrative purposes only and various changes and modifications can be made without deviating from the scope and spirit of the present description, and it goes without saying that such modifications and modifications fall within the scope of the appended claims.

Production Example 1

Preparation of Gas Scavenging Member

Two Teflon AF 2400 films were prepared, and three surfaces of them were sealed to prepare a pouch equipped with a liquid injection port.

Monoethanolamine (MEA) as an amine-based compound was dissolved in bis(trifluoromethane)sulfoneimide ($Tf_2N$) as an ionic liquid so as to contain 10% by weight based on the total weight of the mixed solution, thereby preparing a mixed solution.

50 ml of the mixed solution was injected into the pouch, and the injection port was sealed to prepare a gas scavenging member 1.

Preparation Example 2

Preparation of Gas Scavenging Member

A gas scavenging member 2 was prepared in the same manner as in Preparation Example 1, except that diethanolamine (DEA) was used as an amine-based compound.

Preparation Example 3

Preparation of Gas Scavenging Member

A gas scavenging member 3 was prepared in the same manner as in Preparation Example 1, except that monoethanolamine was dissolved as the amine-based compound, so as to contain 30% by weight based on the total weight of the mixed solution.

Preparation Example 4

Preparation of Gas Scavenging Member

A gas scavenging member 4 was prepared in the same manner as in Preparation Example 1, except that monoethanolamine was dissolved as the amine-based compound, so as to contain 5% by weight based on the total weight of the mixed solution.

Preparation Example 5

Preparation of Gas Scavenging Member

A gas scavenging member 5 was prepared in the same manner as in Preparation Example 1, except that only 30 ml of the mixed solution was injected into the pouch.

Preparation Example 6

Preparation of Gas Scavenging Member

A gas scavenging member 6 was prepared in the same manner as in Preparation Example 1, except that 50 ml of a liquid electrolyte in which $LiPF_6$ was dissolved at 1 M in a mixed solvent of ethylene carbonate and ethylmethyl carbonate in a ratio of 3:7 (volume ratio) was injected instead of the mixed solution into the pouch.

Example 1

$LiNi_{0.8}Co_{0.1}Mn_{0.1}O_2$ was used as a positive electrode active material. 96 wt. % of the positive electrode active material, 2.0 wt. % of Super-P (conductive material), and 2.0 wt. % of PVdF (binder) were added to NMP (N-methyl-2-pyrrolidone) as a solvent to prepare a positive electrode active material slurry.

The positive electrode mixture slurry was coated to a thickness of 50 μm onto aluminum foil. For NMP drying, it was dried and rolled at a speed of 0.2 m/min (about 5 minutes) in a dryer at 130° C. to prepare a positive electrode.

Artificial graphite was used as a negative electrode active material. 96.3 wt. % of artificial graphite, 1.0 wt. % of Super-P (conductive agent), and 2.7 wt. % of PVdF (binder) were added to NMP as a solvent to prepare a negative electrode active material slurry, and then, the resulting slurry was coated to 70 μm onto a copper foil, dried at a speed of 0.2 m/min (about 5 minutes) in a dryer at 130° C., and rolled to prepare a negative electrode.

An electrode assembly was prepared using the above-prepared positive electrode and negative electrode, and a polyethylene film (Celgard, thickness: 20 μm) as a separator.

The gas scavenging member 1 of Preparation Example 1 was disposed on the upper end of the electrode assembly, which was built into a battery case, and injected and sealed using a liquid electrolyte in which $LiPF_6$ was dissolved at 1 M in a mixed solvent of ethylene carbonate, dimethylene carbonate and diethyl carbonate in a ratio of 1:2:1 (volume ratio), thereby preparing the secondary battery.

Example 2

A secondary battery was prepared in the same manner as in Example 1, except that as the gas scavenging member, the gas scavenging member 2 was used instead of the gas scavenging member 1.

Example 3

A secondary battery was prepared in the same manner as in Example 1, except that as the gas scavenging member, the gas scavenging member 3 was used instead of the gas scavenging member 1.

Example 4

A secondary battery was prepared in the same manner as in Example 1, except that as the gas scavenging member, the gas scavenging member 4 was used instead of the gas scavenging member 1.

Example 5

A secondary battery was prepared in the same manner as in Example 1, except that as the gas scavenging member, the gas scavenging member 5 was used instead of the gas scavenging member 1.

Comparative Example 1

A secondary battery was prepared in the same manner as in Example 1, except that the gas scavenging member was not used.

Comparative Example 2

A secondary battery was prepared in the same manner as in Example 1, except that the gas scavenging member 6 was disposed instead of the gas scavenging member 1.

Experimental Example 1

The secondary batteries prepared in Examples 1-5 to Comparative Examples 1-2 were charged up to 4.2V at 0.1 C and 5 mA, stored in a convection oven at 60° C. for 2 weeks, and then the amount of gas generated in the secondary battery was measured by GC-mass analysis, and the results are shown in Table 1 below.

TABLE 1

|  | Amount of gas generated ($CO_2$ content, $\mu\ell$) |
|---|---|
| Example 1 | 267 |
| Example 2 | 375 |
| Example 3 | 106 |
| Example 4 | 1032 |
| Example 5 | 633 |
| Comparative Example 1 | 1619 |
| Comparative Example 2 | 1465 |

Referring to Table 1, it can be confirmed that when a gas scavenging member containing an ionic liquid and an amine-based compound was prepared and formed as in the present disclosure the amount of gas generated was significantly reduced as compared with the case where this was not formed or the general electrolyte composition was added.

Experimental Example 2

A sample was charged to 4.2V at 0.5 C and then charged to 0.05 C under constant voltage at 45° C., and then discharged to 2.5V at 0.5 C. This was repeatedly carried out up to 800 cycles at a temperature of 45° C., then the discharge capacity retention rate (discharge capacity @ 800 cycles/initial capacity×100) was calculated, and the occurrence of venting was confirmed. The results are shown in Table 2 below.

TABLE 2

|  | Capacity retention rate (%) | Pouch venting |
|---|---|---|
| Example 1 | 82.2 | No |
| Example 2 | 81.9 | No |
| Example 3 | 82.1 | No |
| Example 4 | 78.6 | No |
| Example 5 | 81.7 | No |
| Comparative Example 1 | 68.5 | Yes |
| Comparative Example 2 | 72.3 | Yes |

Referring to Table 2, it can be confirmed that according to the present disclosure, venting did not occur and the capacity retention rate was significantly improved.

Based on the above disclosure, various applications and modifications can be carried out by those of ordinary skill in the art without deviating from the spirit and scope of the present disclosure.

INDUSTRIAL APPLICABILITY

As described above, the secondary battery according to an embodiment of the present disclosure includes a gas scavenging member containing a mixed solution of an ionic liquid and an amine-based compound, and therefore, can effectively scavenge the gas generated during the operation of the secondary battery, improve the lifetime characteristics, do not cause issues such as packaging venting, and secure the safety.

The invention claimed is:
1. A secondary battery comprising:
an electrode assembly sealed together with an electrolyte solution within a pouch type battery case, and
a gas scavenging member defines a gas scavenging pouch disposed on at least one inner surface of the battery case, the gas scavenging pouch being a sealed pouch containing 50 ml to 200 ml of a mixed solution,
wherein the gas scavenging member includes the mixed solution of an ionic liquid and an amine-based compound in the gas scavenging pouch.
2. The secondary battery of claim 1, wherein the gas scavenging pouch is composed of a gas permeable polymer.
3. The secondary battery of claim 2, wherein the gas permeable polymer is a poly[4,5-difluoro-2,2-bis(trifluoromethyl)-1,3-dioxole-co-tetrafluoroethylene]-based material.
4. The secondary battery of claim 1, wherein the amine-based compound is an alkanol amine.
5. The secondary battery of claim 1, wherein the amine-based compound is contained in an amount of 5% to 30% by weight based on a total weight of the mixed solution.
6. The secondary battery of claim 1, wherein the ionic liquid is a combination of one or more selected from the group consisting of bis(trifluoromethane) sulfoneimide ($Tf_2N^-$), $[CF_3SO_2]^-$, and $[CF_3CO_2]^-$ $[PF_6]^-$ as anions, and one or more selected from the group consisting of 1-butyl-3-methylimidazolium (bmim), 1-butyl-1-methyl pyrrolidinium (bmpyr), and butyltrimethylammonium (btmamm) as cations.
7. The secondary battery of claim 1, wherein the gas scavenging pouch includes an injection hole to receive the mixed solution, the injection hole being sealable after receiving the mixed solution within the pouch.
8. The secondary battery of claim 1, wherein the gas scavenging member is disposed on an inner surface of an upper end of the battery case along a stacking direction of the electrode assembly.
9. The secondary battery of claim 1, wherein the gas scavenging member defines a footprint smaller than an area of an upper end of the electrode assembly along a stacking direction of the electrode assembly.
10. The secondary battery of claim 1, wherein the electrode assembly comprises a positive electrode, a negative electrode, and a separator interposed therebetween, the positive electrode including a positive electrode mixture containing a positive electrode active material formed on at least one surface of a positive electrode current collector, the positive active material comprising a lithium nickel-based-transition metal oxide containing 80 mol % or more of Ni in the total moles of transition metals excluding lithium.
11. The secondary battery of claim 10, wherein the lithium nickel-based-transition metal oxide is represented by the following Chemical Formula:

wherein, $0 \leq x \leq 0.5$, $0.8 \leq a \leq 1$, $0 \leq b \leq 0.2$, $0 \leq c \leq 0.2$, and the M is at least one selected from the group consisting of Mn, Al, Ti, Mg, Zr, W, Y, Sr, F, Si, Na, Cu, Fe, Ca, S and B.

12. The secondary battery of claim 11, wherein the lithium nickel-based-transition metal oxide is $LiNi_{0.8}Co_{0.1}Mn_{0.1}O_2$.

13. A secondary battery comprising:
a battery case including an electrode assembly and an electrolyte solution, and
a gas scavenging member disposed within the battery case,
wherein the gas scavenging member contains a mixed solution of an ionic liquid and an amine-based compound in a sealed gas scavenging pouch within the battery case.

14. The secondary battery of claim 13, wherein the gas scavenging member defines a gas scavenging pouch.

* * * * *